(12) United States Patent
Garcia et al.

(10) Patent No.: US 11,234,046 B2
(45) Date of Patent: Jan. 25, 2022

(54) SYSTEM AND METHOD FOR ASSOCIATING A DATA SOURCE WITH A MOBILE DEVICE

(71) Applicant: MYE Entertainment, Inc., Stevenson Ranch, CA (US)

(72) Inventors: Anthony E. Garcia, Stevenson Ranch, CA (US); Ronald G. Pace, Naperville, IL (US); Sean McKirdy, Newington, CT (US)

(73) Assignee: MYE Entertainment Inc., Stevenson Ranch, CA (US)

( * ) Notice: Subject to any disclaimer, the term of this patent is extended or adjusted under 35 U.S.C. 154(b) by 0 days.

(21) Appl. No.: 15/786,063

(22) Filed: Oct. 17, 2017

(65) Prior Publication Data
US 2018/0109838 A1     Apr. 19, 2018

Related U.S. Application Data

(60) Provisional application No. 62/408,933, filed on Oct. 17, 2016.

(51) Int. Cl.
| | | |
|---|---|---|
| *H04B 5/00* | (2006.01) | |
| *H04N 21/4363* | (2011.01) | |
| *F42B 6/04* | (2006.01) | |
| *F42B 6/08* | (2006.01) | |
| *F42B 12/34* | (2006.01) | |

(Continued)

(52) U.S. Cl.
CPC ......... *H04N 21/43637* (2013.01); *F42B 6/04* (2013.01); *F42B 6/08* (2013.01); *F42B 12/34* (2013.01); *H04N 21/4104* (2013.01); *H04N 21/4126* (2013.01); *H04N 21/4131* (2013.01); *H04N 21/441* (2013.01);

(Continued)

(58) Field of Classification Search
CPC ........ H04N 21/43637; H04N 21/4104; H04W 12/06; A63B 2225/20; A63B 2225/50; A63B 2225/54
See application file for complete search history.

(56) References Cited

U.S. PATENT DOCUMENTS

| | | |
|---|---|---|
| 5,890,997 A | 4/1999 | Roth |
| 6,013,007 A | 1/2000 | Root et al. |

(Continued)

FOREIGN PATENT DOCUMENTS

| | | |
|---|---|---|
| EP | 1 510 175 A1 | 3/2005 |
| WO | WO 2004-054660 A1 | 7/2004 |
| WO | WO 2006-099617 A2 | 9/2006 |

OTHER PUBLICATIONS

U.S. Appl. No. 11/089,241, filed Sep. 28, 2006, Kondrat, et al.

(Continued)

*Primary Examiner* — Xin Jia
(74) *Attorney, Agent, or Firm* — Steven M. McHugh (57) ABSTRACT

A system and method for associating an audio signal with a Personal Mobile Device (PMD) of a user is provided and includes associating a user with the Personal Mobile Device (PMD) of a user, associating at least one of the user and the PMD with a processing device, determining if the user is using an exercise machine having an exercise machine television and identifying which exercise machine the user is using, determining which channel is being displayed on the exercise machine television and transmitting the audio signal for the channel being displayed available to the user's PMD.

20 Claims, 10 Drawing Sheets

(51) Int. Cl.
*H04N 21/441* (2011.01)
*H04N 21/41* (2011.01)
*H04N 21/81* (2011.01)

(52) U.S. Cl.
CPC ...... *H04N 21/8106* (2013.01); *A63B 2225/20* (2013.01); *A63B 2225/50* (2013.01); *A63B 2225/54* (2013.01)

(56) References Cited

U.S. PATENT DOCUMENTS

| | | |
|---|---|---|
| 6,338,433 B1 | 1/2002 | Drexler |
| 6,514,199 B1 | 2/2003 | Alessandri |
| 6,568,596 B1 | 5/2003 | Shaw |
| 6,902,513 B1 | 6/2005 | McClure |
| 7,056,265 B1 | 6/2006 | Shea |
| 7,128,693 B2 | 10/2006 | Brown et al. |
| 7,434,724 B2 | 10/2008 | Lane |
| 7,578,432 B2 | 8/2009 | Libin et al. |
| 7,628,318 B2 | 12/2009 | Melick et al. |
| 7,810,720 B2 | 10/2010 | Lovett |
| 7,909,741 B2 | 3/2011 | Kim et al. |
| 7,934,641 B2 | 5/2011 | Melick et al. |
| 7,942,328 B2 | 5/2011 | Snyder et al. |
| 7,988,037 B2 | 5/2011 | Yach |
| 2002/0045519 A1 | 4/2002 | Watterson et al. |
| 2002/0107433 A1 | 8/2002 | Mautt |
| 2004/0077462 A1 | 4/2004 | Brown et al. |
| 2004/0092367 A1 | 5/2004 | Corbalis |
| 2004/0162189 A1 | 8/2004 | Hickman |
| 2004/0162466 A1 | 8/2004 | Quy |
| 2004/0229729 A1 | 11/2004 | Albert et al. |
| 2005/0015281 A1 | 1/2005 | Clark |
| 2005/0026123 A1 | 2/2005 | Raniere |
| 2005/0044210 A1 | 2/2005 | Ku |
| 2005/0171410 A1 | 8/2005 | Hjelt et al. |
| 2005/0250995 A1 | 11/2005 | Quy |
| 2005/0272561 A1 | 12/2005 | Cammerata |
| 2006/0122474 A1 | 6/2006 | Teller et al. |
| 2006/0205566 A1 | 9/2006 | Watterson et al. |
| 2006/0217231 A1 | 9/2006 | Parks et al. |
| 2006/0240947 A1 | 10/2006 | Qu |
| 2006/0252602 A1 | 11/2006 | Brown |
| 2006/0258515 A1 | 11/2006 | Kang |
| 2007/0011027 A1 | 1/2007 | Melendez |
| 2007/0032344 A1 | 2/2007 | Guo |
| 2007/0033068 A1 | 2/2007 | Rao et al. |
| 2007/0161459 A1 | 7/2007 | Watson |
| 2008/0096726 A1 | 4/2008 | Riley et al. |
| 2008/0108481 A1 | 5/2008 | Limma et al. |
| 2008/0153670 A1 | 6/2008 | McKirdy et al. |
| 2009/0286654 A1 | 11/2009 | Rice |
| 2012/0116555 A1 | 5/2012 | McKirdy et al. |
| 2013/0032634 A1 | 2/2013 | McKirdy et al. |
| 2015/0238817 A1* | 8/2015 | Watterson .......... A63B 22/0023 482/8 |
| 2015/0238819 A1* | 8/2015 | Volkerink .............. H04W 4/70 482/4 |
| 2016/0301953 A1* | 10/2016 | Garcia Navarro .......................... H04N 21/2353 |

OTHER PUBLICATIONS

U.S. Appl. No. 11/754,565, filed Dec. 4, 2008, Karkanias, et al.
U.S. Appl. No. 12/778,067, filed Sep. 2, 2010, Michael J. Shea.
U.S. Appl. No. 12/469,222, filed Nov. 25, 2010, McCombie, et al.
U.S. Appl. No. 12/546,152, filed Feb. 24, 2011, Richard Wojdyla.
U.S. Appl. No. 12/752,348, filed Mar. 10, 2011, Frysz, et al.
U.S. Appl. No. 12/879,932, filed Mar. 17, 2011, Gagner, et al.
U.S. Appl. No. 12/572,386, filed Apr. 7, 2011, Brown, et al.
U.S. Appl. No. 12/907,672, filed Apr. 21, 2011, Otavio Good.
U.S. Appl. No. 12/610,445, filed May 5, 2011, David Paul Yach.
U.S. Appl. No. 12/953,868, filed Jun. 30, 2011, Bower, et al.
U.S. Appl. No. 12/238,994, filed Apr. 1, 2010, Glenn Patton Bradford.

\* cited by examiner

SYSTEM AND METHOD FOR ASSOCIATING A DATA SOURCE WITH A MOBILE DEVICE

CROSS REFERENCE TO RELATED APPLICATIONS

This application is related to and claims the benefit of the filing date of U.S. Provisional Patent Application Ser. No. 62/408,993 filed Oct. 17, 2016, the contents of which are incorporated herein by reference in its entirety.

FIELD OF THE INVENTION

The present invention relates generally to a system and method for communicating with a mobile device and more particularly to a system and method for associating a data source with a mobile device and communicating data content to the mobile device based on location.

BACKGROUND OF THE INVENTION

As is known, the exercise and fitness industry currently offers electronic entertainment for people while they exercise. However, the person exercising needs to be able to receive and/or interact with the provided entertainment without disturbing other customers that are exercising in close proximity. As such, the entertainment content that is communicated to the customer needs to be delivered and/or received by the customer in such a way as to limit the broadcast audience of the entertainment content to only one particular customer. One of the more popular ways to accomplish this is to provide the ability for the customer to plug in a set of headphones into a 3.5 mm headphone jack port that is either part of the exercise machine that the customer is using or that is associated with a hardware device that is attached to the exercise machine that the customer is using wherein the exercise machine and/or hardware device is configured to receive audio input from a television (or other device) associated with the exercise machine.

While this approach is widely used throughout the industry, it has some disadvantages. One such disadvantage, for example, involves the headphone jack/port that the user uses to connect headphones to the exercise machine. Unfortunately, due to either poor construction and/or wear and tear because of improper or accidental retraction of the headphone cable from the port, the headphone jack/port currently has a high probability of being damaged. This causes intermittent sound quality or even worse, a complete loss of sound for the customer using the exercise machine. Additionally, the exercise facility staff may not always be aware of these quality issues as most gym patrons will simply not report the issues to the front desk, thus allowing the sound quality problem to linger and be unresolved for a lengthy period of time.

Another approach for letting a customer listen to audio data while using exercise equipment involves the use of a system that uses a smartphone application capable of delivering ambient (wall mounted) TV audio signals (for one example, the AppAudio system offered from MYE Inc.) that can be selected for listening by the user through the smartphone application. In this approach, the wall mounted TV's have their audio outputs sent into a computer which allows for these audio signals to be manually selected via the smartphone application. While this may be a good solution for gyms that have TV's installed on a wall for shared viewing by customers, this approach is not a good solution for gyms that want to associate specific TV display devices with specific exercise machines (whether the TV display device is attached to or embedded into the exercise machine). This is because this approach is not capable of allowing an individual customer using a specific exercise machine to change the TV channel or TV audio for a specific television that is associated with the exercise machine they are using. Moreover, current systems and methods are not capable of identifying which exercise machine a specific customer is using and allowing that specific customer to receive a specific channel for that specific exercise machine which can be heard through the user's personal content device.

While some exercise machines having embedded TV displays that offer a wireless (Bluetooth connection) pairing capability with headphones, this has the disadvantage of being limited to only those headphones that have a wireless (ex: Bluetooth) capability and will not support the majority of existing headphone products that plug directly into a smartphone via a 3.5 mm connector or other hardwired connection (such as the Apple 'Lightening' connector or even a USB interface). Moreover there are real challenges with managing the Bluetooth compatibility between headsets and exercise machine displays due to software compatibility issues along with challenges on how to pair the individual headset since the exercise machine will most likely need a user interface (touch screen display) that will require the user to manually input a unique code in order for the user to pair their Bluetooth headset successfully. Furthermore, this solution also does not enable communication with exercise machines which do not contain any embedded or add-on/aftermarket wireless communication capability.

SUMMARY OF THE INVENTION

A system for allowing a data signal to be associated with a personal mobile device is provided and includes a signal source, wherein the signal source is communicated with at least one of an exercise machine and an exercise machine television, an identification device, wherein the identification device is configured to identify a user of the exercise machine and a processing device, wherein the processing device is communicated with at least one of the exercise device and the identification device, and wherein the processing device is configured to receive at least a portion of the data signal and communicate the at least a portion of the data signal to the personal mobile device responsive to the identification device.

A system for associating an audio signal with a personal mobile device is provided and includes an exercise machine, an exercise machine television, wherein the exercise machine television is associated with the exercise machine, a signal source, wherein the signal source is communicated with the exercise machine television, an identification device, wherein the identification device is associated with the exercise machine and configured to identify a user of the exercise machine and a processing device, wherein the processing device is communicated with at least one of the exercise device and the identification device, and wherein the processing device is configured to identify a channel being displayed on the exercise television and communicate the audio signal for the channel to the personal mobile device responsive to the identification device.

A system and method for associating an audio signal with a Personal Mobile Device (PMD) of a user is provided and includes associating a user with the Personal Mobile Device (PMD) of a user, associating at least one of the user and the PMD with a processing device, determining if the user is using an exercise machine having an exercise machine television and identifying which exercise machine the user is using, determining which channel is being displayed on the exercise machine television and transmitting the audio signal for the channel being displayed available to the user's PMD.

BRIEF DESCRIPTION OF THE DRAWINGS

The foregoing and other features and advantages of the present invention should be more fully understood from the accompanying detailed description of illustrative embodiments taken in conjunction with the following Figures in which like elements are numbered alike in the several Figures.

DETAILED DESCRIPTION OF THE INVENTION

In accordance with the present invention, a unique and novel system and method for associating a signal source (such as an audio signal source) with a particular exercise machine and/or a Personal Mobile Device (PMD) of someone using the particular exercise machine is provided and described herein. It is contemplated that the particular exercise machine includes a television (or other entertainment device) which is associated with the particular exercise machine and that a user of the exercise machine has a PMD with a software application installed which would allow the user to interface with the system of the invention. This advantageously allows a person using an exercise machine to use their PMD to listen to the audio signal of the channel being displayed on the television display which is associated with the specific exercise machine they are using.

Figure 1:
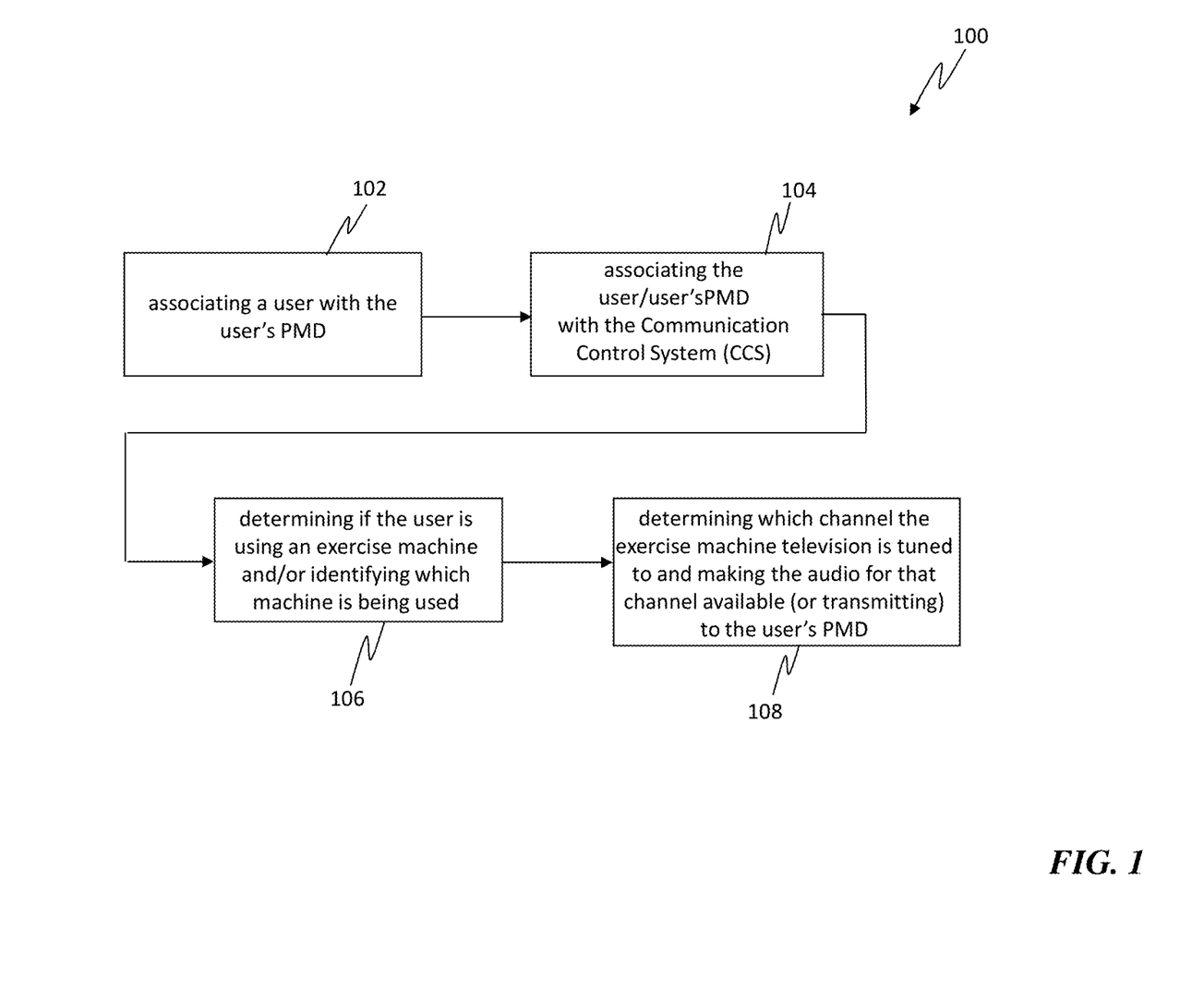
FIG. 1 shows an operational block diagram illustrating a method for associating a signal from a signal source with an exercise machine and/or a personal mobile device (PMD) of someone using the exercise machine, in accordance with one embodiment of the invention.
Figure 2A:
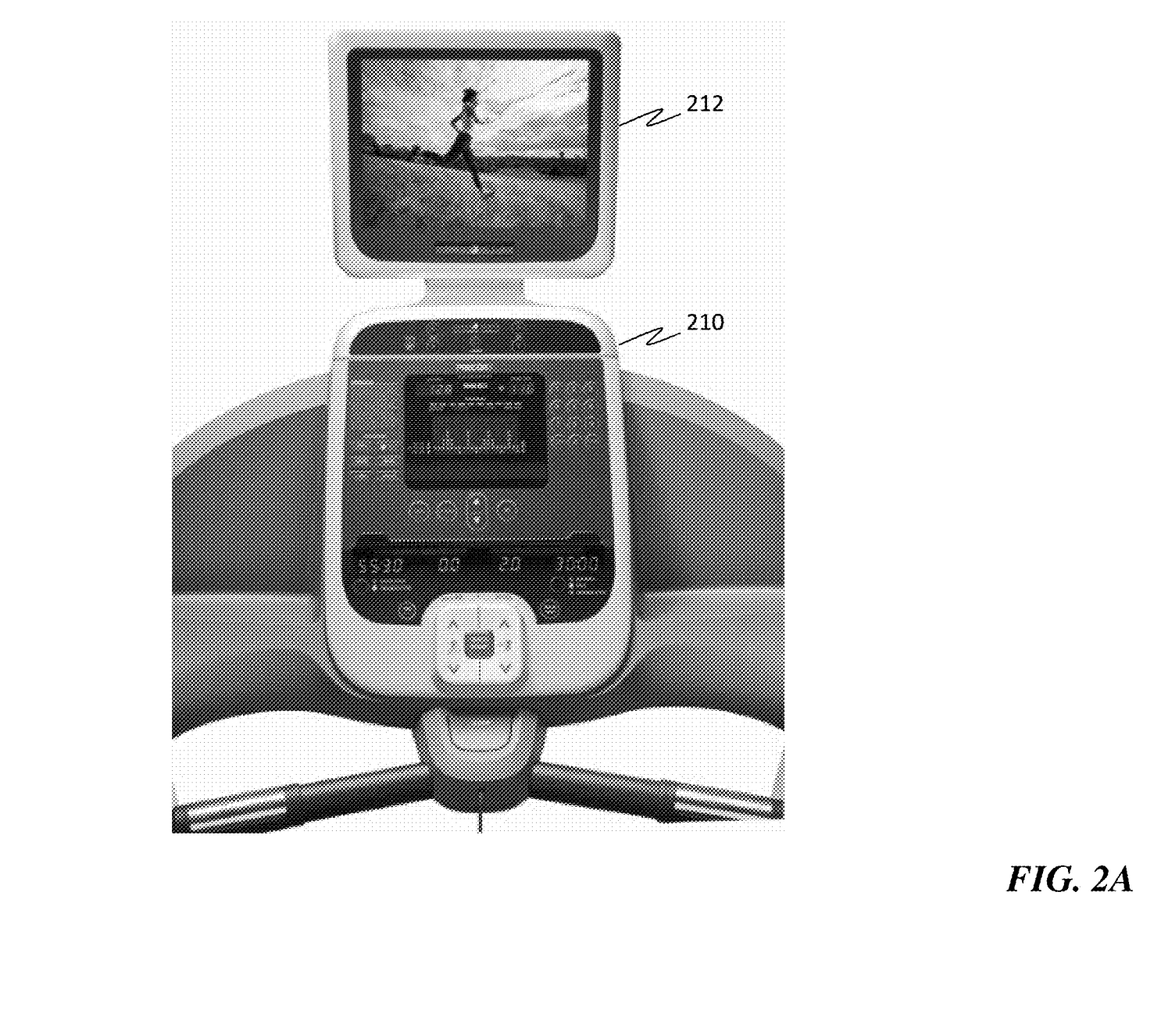
FIG. 2A shows one embodiment of an exercise machine and an exercise machine television.
Figure 2B:
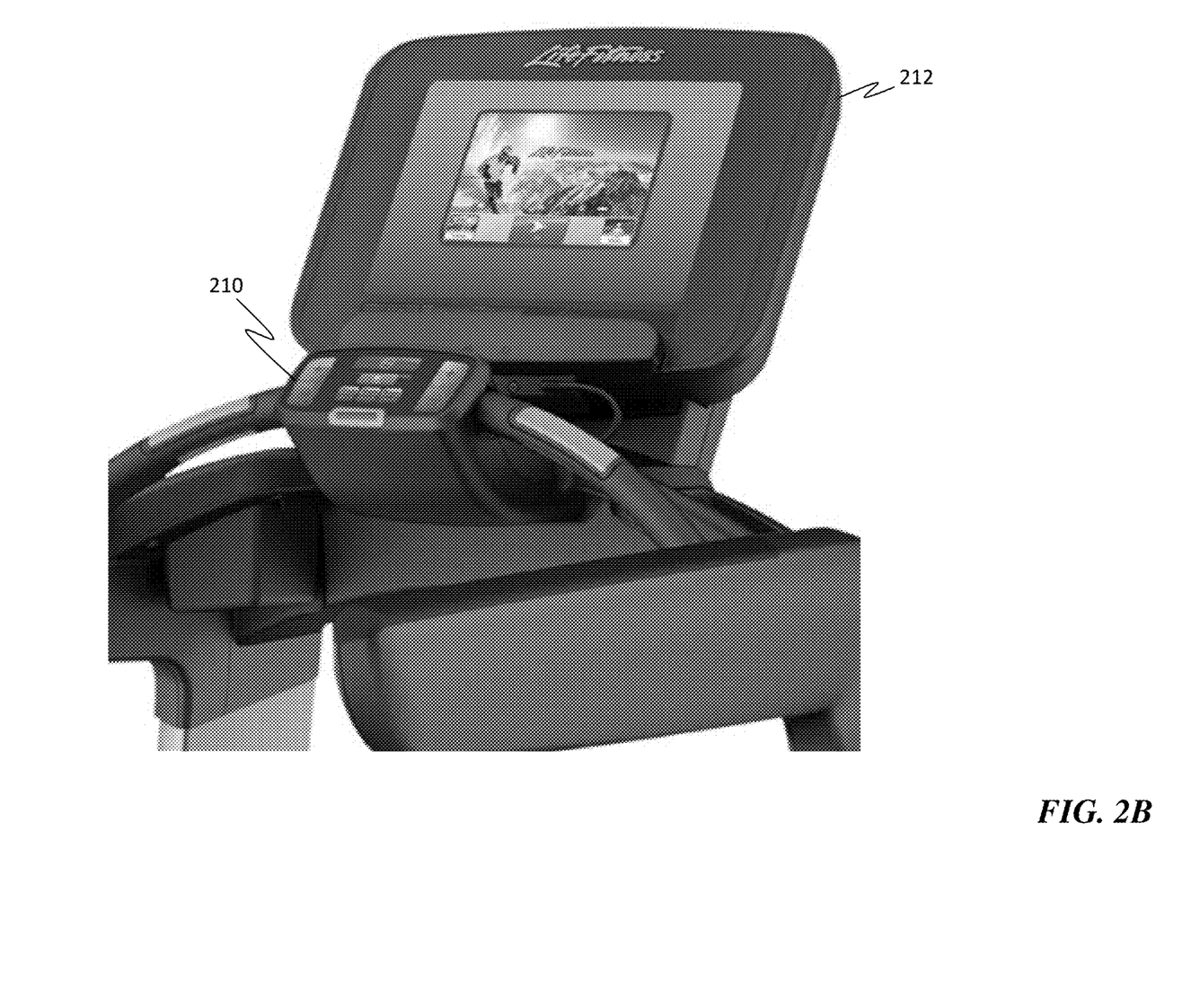
FIG. 2B shows another embodiment of an exercise machine and an exercise machine television.
Figure 2C:
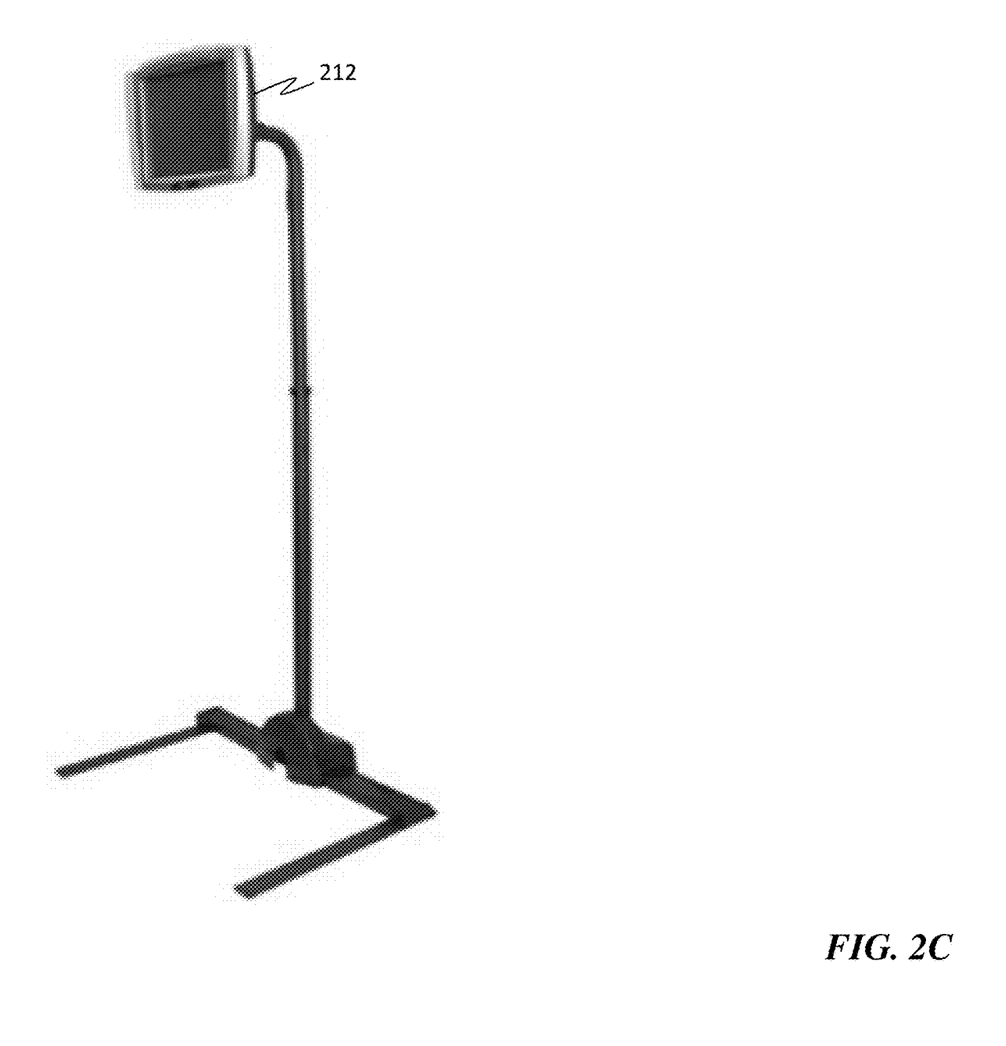
FIG. 2C shows one embodiment of an exercise machine television for use as an add-on with an exercise machine.

In accordance with one embodiment of the invention, referring to FIG. 1 a method 100 for associating a signal (such as an audio and/or video signal) from a signal source (such as a Cable/Satellite Set Top Box) with a particular exercise machine and/or a personal mobile device (PMD) of someone using the particular exercise machine is provided and includes associating a user (such as a member of an exercise club) with the user's PMD, as shown in operational block 102. It should be appreciated that this may be accomplished via a software application located on the user's PMD, wherein the software application may include a unique user identifier and which may have access to the user's information. The method 100 further includes associating the user and/or the user's PMD with the Communication Control System of the exercise club having exercise club system software, as shown in operational block 104. This may be accomplished by associating the unique user identifier with the Communication Control System so that the Communication Control System and the software application on the user's PMD can wirelessly communicate with each other.

The method 100 further includes determining if the user has started using an exercise machine, as shown in operational block 106. It should be appreciated that this may be accomplished via a variety of methods. For example, one way to accomplish this may include providing facial recognition hardware and/or software with the exercise machine (or facial recognition software remote from the exercise machine), wherein when the user begins interacting with (or is proximate to) the exercise machine the facial recognition hardware and/or software would sense the user and identify the user. The facial recognition hardware and/or software may then communicate this information to the Communication Control System software which will associate the user and/or the user's PMD with the exercise machine. Another way to accomplish this may be using Near Field Communication (NFC) technology, wherein the exercise machine (and/or associated hardware) may be equipped with NFC circuitry. When the user starts interacting with (and/or is located proximate to) the exercise machine using the PMD which may also includes NFC circuitry, the NFC circuitry of the exercise machine may interact with the NFC circuitry of the user's PMD. The exercise machine (and/or associated NFC circuitry) may then communicate this information (such as user unique identification information, system log-in credentials, etc) to the Communication Control System which will associate the user and/or the user's PMD with the exercise machine.

Still yet another way this may be accomplished may be by using scanning technology, wherein the exercise machine may include scanning hardware and/or software, such as a front facing camera which may be associated with the exercise machine and/or associated hardware. When the user starts interacting with the exercise machine, the user will scan a barcode (or other code) that may be created and/or displayed by the software application on the user's PMD, wherein the barcode includes information about the user. The barcode hardware and/or software may then communicate this information to the Communication Control System which may associate the user and/or the user's PMD with the exercise machine. Additionally, hardware associated with the exercise machine (such as exercise machine television and/or display hardware) may also be able to display a barcode (or other type of code, such as a QR code) that may contain information about the exercise machine and/or the display hardware associated with the exercise machine. When the user starts interacting with the exercise machine, using the PMD the user may scan a barcode that may be created and/or displayed by the software application on the hardware associated with the exercise machine.

A barcode label may also be affixed to the exercise machine and/or associated display hardware where the barcode on the sticker contains data that may also be associated with the exercise machine or display hardware. The barcode hardware and/or software on the PMD may then communicate this information to the Communication Control System which may associate the user and/or the user's PMD with the exercise machine. It should be appreciated that any optical device and/or method for determining if a user is using or proximate to the exercise machine may be used suitable to the desired end purpose. For example, any identification system/device that uses optical sensors or touch sensors to detect physical inputs (numbers, designs, etc. . . . such as a keypad), shapes, faces and/or biometrics (for example, finger print, etc) may be used. As one example, the exercise machine and/or the exercise machine television may also be configured to communicate with the user's PMD by using a method such as controlling the blinking/flashing or a LED light or combination of display screen pixels where the flashing light source is detected by the PMD. The flashing light source may emit a code (in the form of pulsing light) that is detected by the optics (camera sensor) of the PMD, where the code may contain information about the exercise machine and/or the exercise machine television that could be used to associate the user with the exercise machine. Other methods such as audible and/or inaudible (ultrasonic pitches) based detection methods/devices can also be used by the system where the exercise machine and/or the exercise machine television can emit (via a speaker) such encoded sound based tones/pitches where the user's PMD device has software and hardware (such as a microphone) which is configured to decode the sound based signal.

The method 100 may also include determining which channel the exercise machine television is tuned to and transmitting (or making available to the user's PMD) the audio for that channel to the user's PMD, as shown in operational block 108. It should be appreciated that the exercise machine, the television signal input and/or the exercise machine television may be communicated (i.e. wireless and/or hard wired signal connection) with the Communication Control System. As such, this may be accomplished by the Communication Control System communicating with the at least one of the exercise machine, the television signal input and/or the exercise machine television to determine which channel the exercise machine television is tuned to. Moreover, the method 100 includes communicating the audio signal for the channel being displayed on the exercise machine television to the user's PMD. This may be accomplished via wireless communication protocol such as Bluetooth, ZigBee, NFC, RFID, WiFi, Ant+, Infrared, etc. It should be appreciated that the audio signal may be communicated via a wireless module, a cable input set top box and/or via the exercise machine television which may be configured for wireless communication.

Accordingly, one embodiment of the method 100 may operate as follows. A user would enter an exercise club, wherein the exercise club would include a Communication Control System and an exercise machine having an exercise machine television (and/or display hardware device) associated with it, wherein the exercise machine and/or exercise machine television would be in signal communication with the Communication Control System. The Communication Control System may include a processing device (and other associated circuitry), one or more wireless networks and one or more wireless modules, wherein the Communication Control System may be communicated with a Set Top Box (STB) (Cable and/or Satellite) for receiving a cable/satellite video and/or audio signal input. Additionally, the user would have a PMD which would include a software application configured to engage with at least one of the Communication Control System, the exercise machine and/or the exercise machine television.

It should be appreciated that the software application may be constantly active (i.e. running in the background) on the PMD or the software application may need to be activated via the user. In either case, when the user enters an exercise facility, the Communication Control System would interact with the software application on the user's PMD thereby associating the user and the user's PMD with the Communication Control System. This advantageously may allow the Communication Control System to determine if the user is a current member of the exercise facility and if so, sign the user into the exercise facility. Additionally, this would allow the Communication Control System to determine the level of membership of the user. For example, the user may only be allowed to use certain exercise machines or view certain television channels. The Communication Control System may then allow the user to only use certain exercise machines or only have access to certain entertainment channels based on their membership status/level.

The user would approach the exercise machine and begin interacting with (or be located proximate too) the exercise machine, wherein the user and/or the user's PMD would be associated with the exercise machine. As discussed hereinabove, this may be accomplished via facial recognition, NFC, scanning of a barcode (or entry of a member ID). Again, since the user and the user's PMD were previously associated, once the user's PMD is associated with the exercise machine, the user may be associated with the exercise machine as well. The user may begin using the exercise machine and viewing the exercise machine television. It should be appreciated that the exercise machine television may be configured to turn on automatically once the user starts exercising on the exercise machine and/or the exercise machine television may be configured to be switch activated thereby requiring the user to 'manually turn on' the exercise machine television and/or the exercise machine television would be constantly on. Additionally, upon startup the exercise machine television may be configured to be set to a default channel and/or to the last channel watched on the exercise machine television. In any case, if the user did not like the channel to which the exercise machine television was set, the user may cause the exercise machine television to be tuned to a preferred channel. This may be accomplished via controls on the exercise device, the exercise machine television and/or the software application on the PMD.

At this point, the user and the user's PMD are associated with the exercise machine and/or the exercise machine television and the Communication Control System (which may be communicated with at least one of the exercise machine, the television signal input and/or the exercise machine television) is informed by at least one of the exercise machine, the television signal input and/or the exercise machine television to which channel the exercise machine television is tuned. The Communication Control System may then transmit (or make available) the audio for the channel to which the exercise machine television is tuned to the software application on the user's PMD. This will advantageously allow the user to listen to the channel audio via the user's PMD. Accordingly, when the user begins working out on the exercise machine and tunes the exercise machine television to a particular channel, the Communication Control System will transmit the audio for that particular channel to the software application resident on the user's PMD thereby allowing the user to listen to the audio for that channel. If the user changes the channel of the exercise machine television to another channel, the Communication Control System may recognize (or be informed of) that and transmit the audio for the new channel to the software application resident on the user's PMD. The Communication Control System may also continuously transmit (or make available) the audio signal to the user's PMD without any need to recognize any channel changes made by the person using the exercise machine.

Additionally, in one embodiment of the invention, if the user uses finishes using a first exercise machine and then starts using a second exercise machine, the method and system of the invention may allow the Communication Control System to configure the exercise machine television on the second exercise machine to the channel that the user was playing on the first exercise machine and transmit the audio for that channel to the user's PMD after the user and/or the user's PMD is identified and/or associated with the second exercise machine. For example, consider the situation where a user is using a first exercise machine having a first exercise machine television and is watching channel 5 on the first exercise machine television. In this case, the Communication Control System will be transmitting the audio for channel 5 to the user's PMD. When the user finishes using the first exercise machine, the user begins using a second exercise machine having a second exercise machine television. The Communication Control System identifies that the user and/or the user's PMD is now associated with (and/or the user is using) the second exercise machine (as discussed hereinabove) and the Communication Control System tunes the second exercise machine television to channel 5 (for example, the Communication Control System may send a control signal or control software command to either the exercise machine or the associated display hardware device so as to set the appropriate channel) and transmits (or continues transmitting) the audio for channel 5 to the user's PMD. It should be appreciated that when the user stops exercising on the first exercise system machine or moves away from the first exercise machine or turns off the first exercise machine, the Communication Control System may disassociate the user and/or the user's PMD from the first exercise machine. This feature would advantageously allow a user to move between exercise machines without having to interact with the software application on the user's PMD. Additionally, although it is discussed herein as the Communication Control System wirelessly transmitting the audio signal to the PMD, it is contemplated that the audio signal may be wirelessly transmitted via any method and or device suitable to the desired end purpose. For example the audio may be wirelessly transmitted by the Set Top Box, the Communication Control System, the exercise machine television and/or an external transmission device associated with any or all of the above components.

In accordance with a second embodiment of the invention, it is contemplated that the software application located on the user's PMD may be configured to receive the audio for all of the channels being viewed in the exercise club, wherein the software application would filter out all audio channels with the exception of the audio for the channel that is being displayed on the exercise machine television that the user is viewing. In this embodiment, the method would operate similarly to the method of the first embodiment, however the Communication Control System and/or the Set Top Box would wirelessly transmit the audio for all (or only a portion) of the channels that are capable of being displayed on the exercise machine televisions located in the exercise club. For example, if there are five (5) exercise machine televisions in the exercise club and each of the five (5) exercise machines are displaying different channels, then the Communication Control System and/or the Set Top Box would wirelessly transmit the channels for the five (5) different channels simultaneously. The software application on the user's PMD would make available to the user the audio channel that corresponds to the exercise machine television that the user is watching and filter out the remaining four channels. It should be appreciated that in one embodiment, the Communication Control System may also only transmit the audio and/or video for the channels on the exercise machines that are actively being used and that are not in an idle state to maximize the efficiency of the system by not transmitting audio and/or video for exercise machines that are not being used. Moreover, the system may monitor the software states of the exercise machines to help determine if an exercise machine is being used or sitting idle.

And because the Communication Control System and the software application on the user's PMD are configured to communicate with each other, when the user changes the channel on the associated exercise machine television the Communication Control System (and/or Set Top Box and/or exercise machine television) would inform the software application on the user's PMD that the channel was changed. The software application on the user's PMD would then only play the new audio channel for listening by the user of the exercise machine. Moreover, at least one of the Communication Control System and/or the software application on the user's PMD may store which channel the user was watching. Thus, if the user stops using a first exercise machine and starts using a second exercise machine, at least one of the Communication Control System and/or the software application on the user's PMD would cause the exercise machine television on the second exercise machine to be tuned to the channel that was previously being viewed by the same user on the first exercise machine television and the software application on the user's PMD would make the audio and/or video for that channel available to the same user.

It should be appreciated that in one embodiment, the audio and/or video signal may be supplied to the exercise club via an external input into a Set Top Box which may communicate the audio and/or video signal to the exercise device television. The exercise device television may then communicate the audio and/or video signal to the Communication Control System via a communication module, which may communicate the audio and/or video signal via a hardwired and/or a wireless connection. The communication module may be external to the exercise machine and/or the exercise machine television and may also be powered through a power interface port that is located on either the exercise machine or the exercise machine television (display hardware device). The communication module may also use a software protocol to communicate with either the exercise machine and/or the exercise machine television (display) (such as the CSAFE protocol), where data may be obtained by the communication module from the exercise machine and/or the exercise machine television (display), where it may be used by the Communication Control System to further identify the audio and/or video signal associated with the exercise machine. The Communication Control System, which may include a wireless network, may then transmit the audio and/or video signal to the desired PMD via the wireless network (i.e. Wi-Fi, Bluetooth®, etc.). It is contemplated that in other embodiments, the components of the invention may be combined as desired suitable to the desired end purpose. For example, in one embodiment, the Set Top Box and/or communication module may be an integral part of the Communication Control System. While in another embodiment, the exercise machine and/or the exercise machine television may be communicated with the Communication Control System and the audio and/or video signal may be transmitted by the exercise machine television. Furthermore, it is contemplated that the invention may only be used to communicate both of the audio and/or video signal or only the audio or video portion of the signal. Thus, in the case that the exercise machine does not have an exercise television, the user may receive both the audio and video signal so that the channel may be play on the user's PMD.

Referring to FIG. 1A, FIG. 1B, FIG. 1C and FIG. 2, a system 200 for associating a signal source (such as an audio and/or video signal source) with a particular exercise machine and/or a Personal Mobile Device (PMD) of someone using the exercise machine is provided, in accordance with one embodiment of the invention. The system 200 includes a Communication Control System (CCS) 202 having a processing device 204 (along with associated circuitry, wireless network device(s) and other components) and a communication module 206, a signal source 208 and an exercise machine 210 having an exercise machine television 212. It should be appreciated that the communication module 206 may be integrated with the CCS 202, the exercise machine 210 and/or the exercise machine television 212 or the communication module 206 may be a separate stand-alone module. It should be further appreciated that at least one of the CCS 202, the exercise machine 210 and/or the exercise machine television 212 includes an identifier device 214 configured to identify a user. The identifier device 214, which may be external to or integrated with the exercise machine 210 and/or the exercise machine television 212, may be a facial recognition device configured to optically scan and identify a user, a Near Field Communication device configured to interact with a user's Personal Mobile Device (PMD) 216 to identify a user, a barcode scanner configured to scan a barcode (or other code, such as a QR code) to identify a user and/or an input keypad configured to allow a user to input an identifier code, a identifier pattern, and/or a biometric input to identify a user, and a barcode display capability configured to display a barcode on the display hardware device so as to allow the user's PMD 216 to identify a user.

Figure 3:
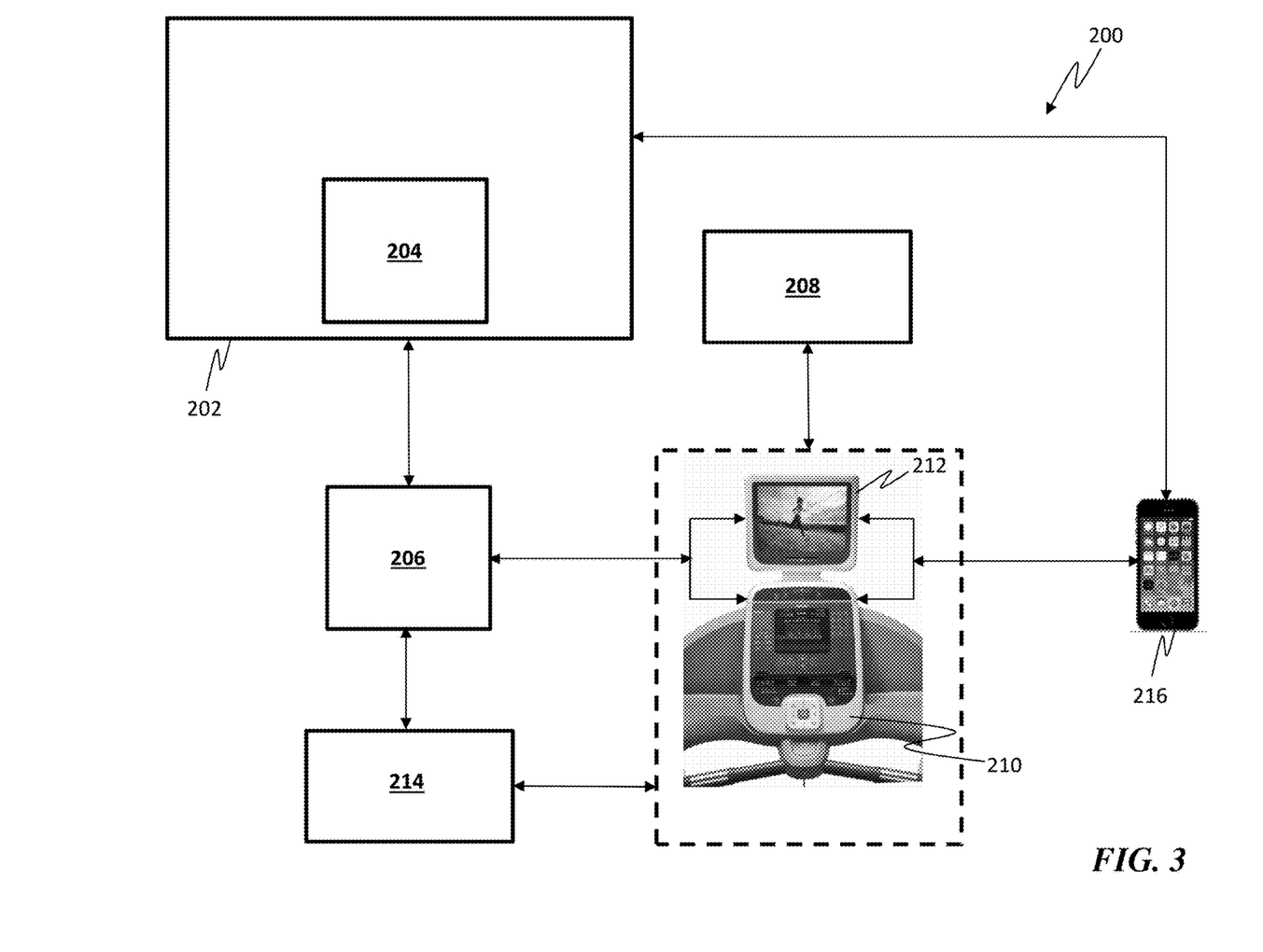
FIG. 3 shows a system for associating a signal source with an exercise machine and/or a Personal Mobile Device (PMD) of someone using the exercise machine, in accordance with one embodiment of the invention.

Additionally, the signal source 208 may be a Cable/Satellite Set Top Box configured to receive a cable/satellite audio and/or video signal and may be in signal communication (wireless and/or hardwired, such as via a coaxial cable, audio/video input, etc.) with at least one of the exercise machine 210 and/or the exercise machine television 212. It should be appreciated that the exercise machine 210 and/or the exercise machine television 212 may be in further signal communication with the communication module 204 of the CCS 202. Furthermore, the CCS 202 may be configured to generate/control a wireless Wi-Fi network which is configured to communicate with users via the user's PMD 216 via a software application that is installed onto the user's PMD 216. The software application may either be constantly running in the background on the user's PMD 216 or the software application may be needed to be activated to interact with the CCS.

In accordance with one embodiment of the invention, the system 200 may operate as follows. A user having the user's PMD 216 would enter the exercise club, wherein if the software application on the PMD 216 is not running the user would activate the software application. The CCS 202 would interact with the software application on the PMD 216 to identify the user. This may be accomplished by the software application communicating information specific to the user (such as a unique identifier/member code) to the CCS 202. The CCS 202 may 'sign' the user into the exercise club. The user may then approach an exercise machine 210 and the identifier device 214 would identify the user. The user may operate the exercise machine television 212 to cause the exercise machine television 212 to be tuned to a desired channel. It should be appreciated that if the exercise machine television 212 is already on a desired channel the user may not have to take any action and may simply begin watching the channel being displayed. The identifier device 214 would inform CCS 102 that the user is using the exercise machine television 210 and the CCS 202 would identify which channel is being displayed on the exercise machine television 212. It should be appreciated that the CCS 202 would constantly have information about which channel is being displayed on the exercise machine television 212 because the exercise machine 210 and/or exercise machine television 212 is communicated with the CCS 202 via the communication module 206.

The CCS 202 may transmit the audio portion of the audio/video signal for the channel being displayed on the exercise machine television 212 to the user's PMD 216 to allow the user to play the audio for the channel being played. It is contemplated that in other embodiments, the CCS 202 may transmit both the audio and the video portion of the audio/video channel to the user's PMD 216. In one embodiment, when the user is done using the exercise machine 210, the user may move to a second exercise machine 218 having a second exercise machine television 220. In this embodiment, when the user finishes using the exercise machine 210, the user moves away from the exercise machine 210 and approaches the second exercise machine 218. The identifier device 214 for the second exercise machine 218 identifies the user and informs the CCS 202 that the user is now using second exercise machine 218. The CCS 202 may then transmit the audio for the channel being displayed by the second exercise machine television 220 to the user's PMD 216. It should be appreciated that in another embodiment, the CCS 202 may automatically tune the second exercise machine television 220 to the channel (and/or a user preferred channel) that was playing on the first exercise machine television 212.

It should be appreciated that the one or more of the elements of the system 200 may be integrated together as desired. For example, the communication module 206 may be integrated (in whole or in part) with the CCS 202 and/or exercise machine 210/exercise machine television 212 or the communication module 206 may be a separate external component to the CCS 202. Additionally, the signal source 208 may be integrated into the CCS 202, the exercise machine 210 and/or the exercise machine television 212. Moreover, in still other embodiments, the exercise machine 210 and/or the exercise machine television 212 may be configured to wirelessly transmit the audio signal to the PMD 216.

It is contemplated that in another embodiment, the CCS 102 and/or the software application on the user's PMD 216 may control what is play/displayed to the user based on the membership level/status of the user. For example, the user may only be a 'standard' member which only allows the user access to certain channels or the user may be a 'premium' member which allows the user access to all of the channels. It should be appreciated that although the invention is described herein with regards to an audio/video signal, it is contemplated that invention may also be applied to any type of signals suitable to the desired end purpose, such as audio signals (satellite radio, or web based content, etc.), video signals and/or streaming data (web based audio/video).

Figure 4:
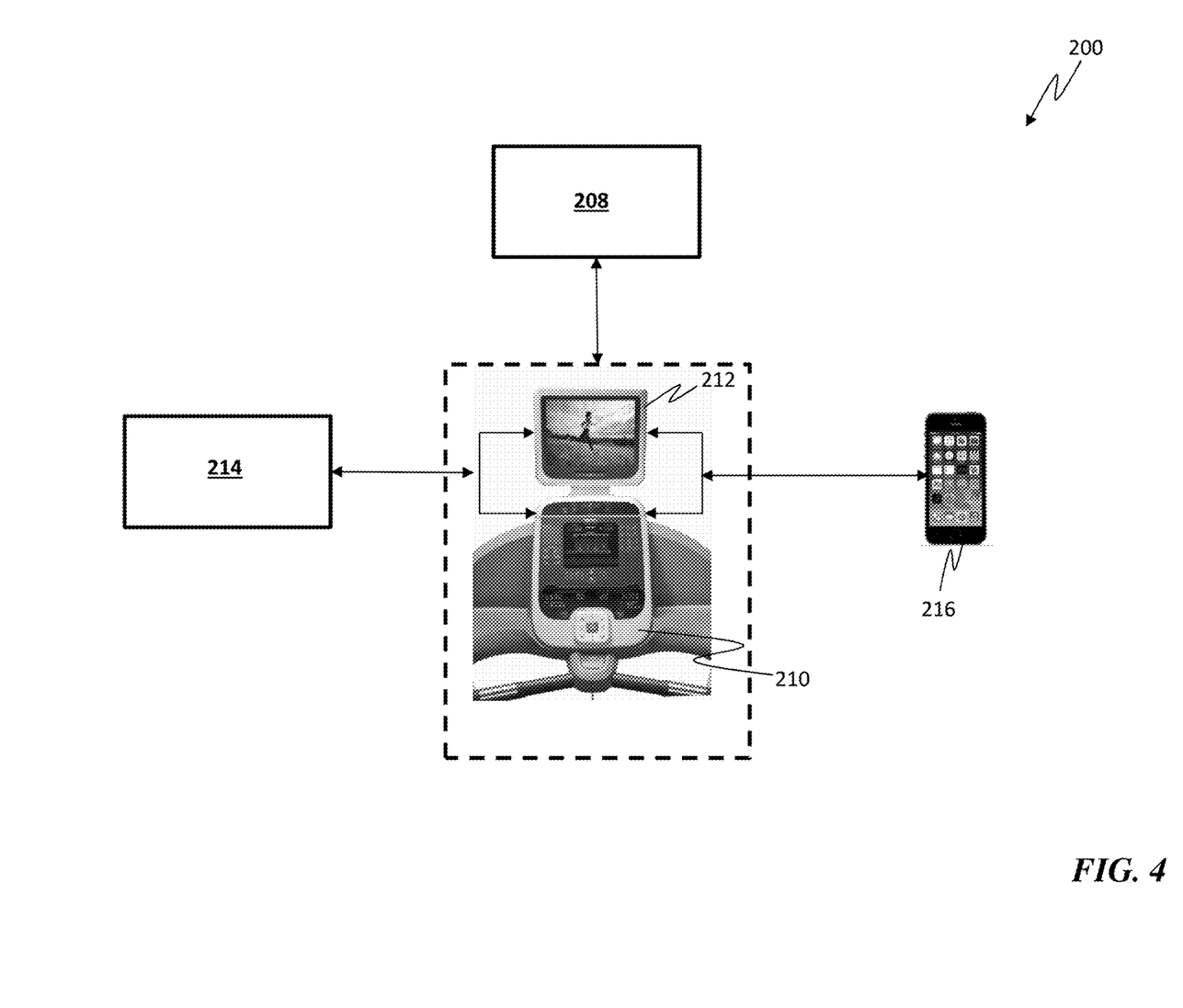
FIG. 4 shows a system for associating a signal source with an exercise machine and/or a Personal Mobile Device (PMD) of someone using the exercise machine, in accordance with another embodiment of the invention.
Figure 5:
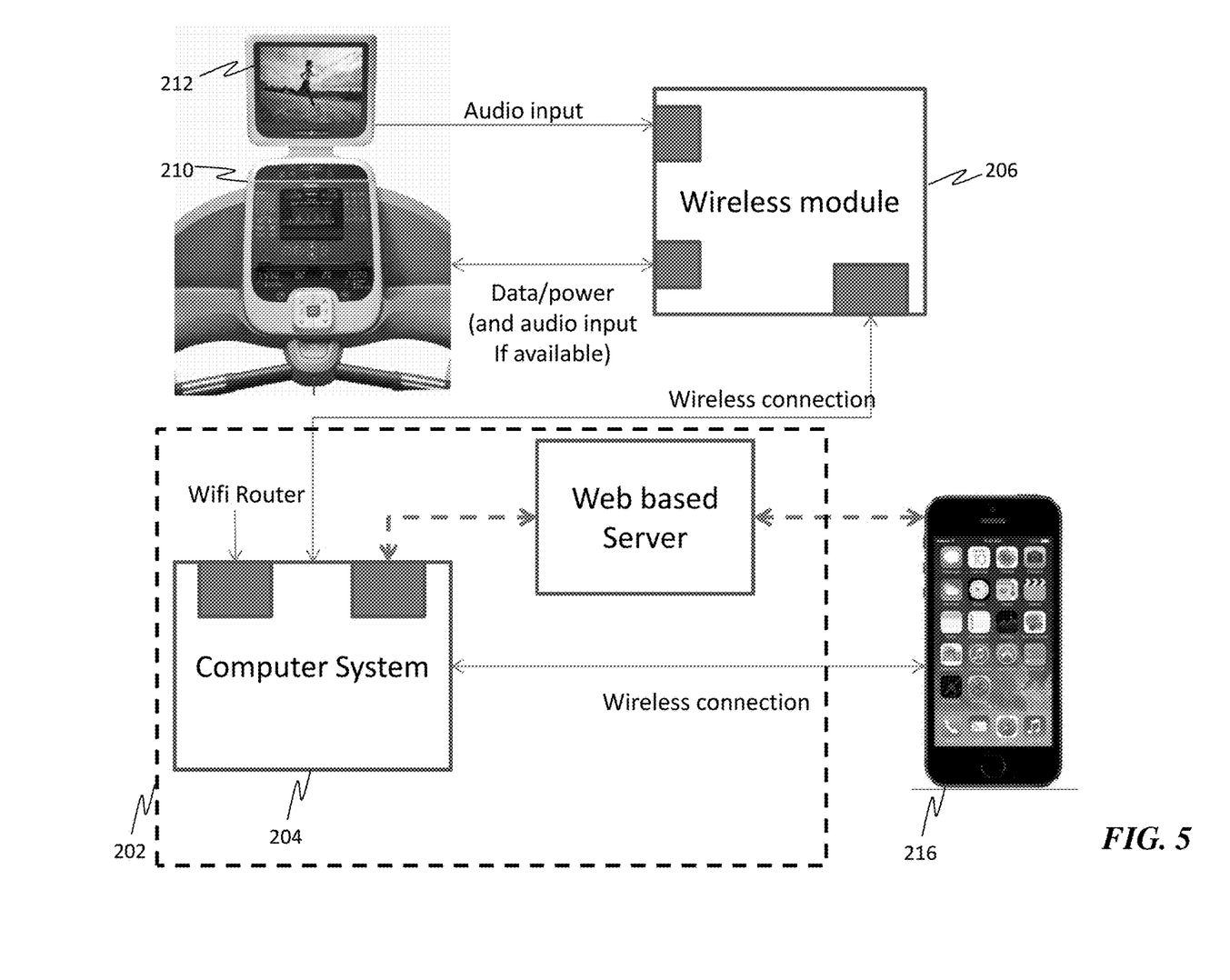
FIG. 5 shows a system for associating a signal source with an exercise machine and/or a Personal Mobile Device (PMD) of someone using the exercise machine, in accordance with still yet another embodiment of the invention.
Figure 6:
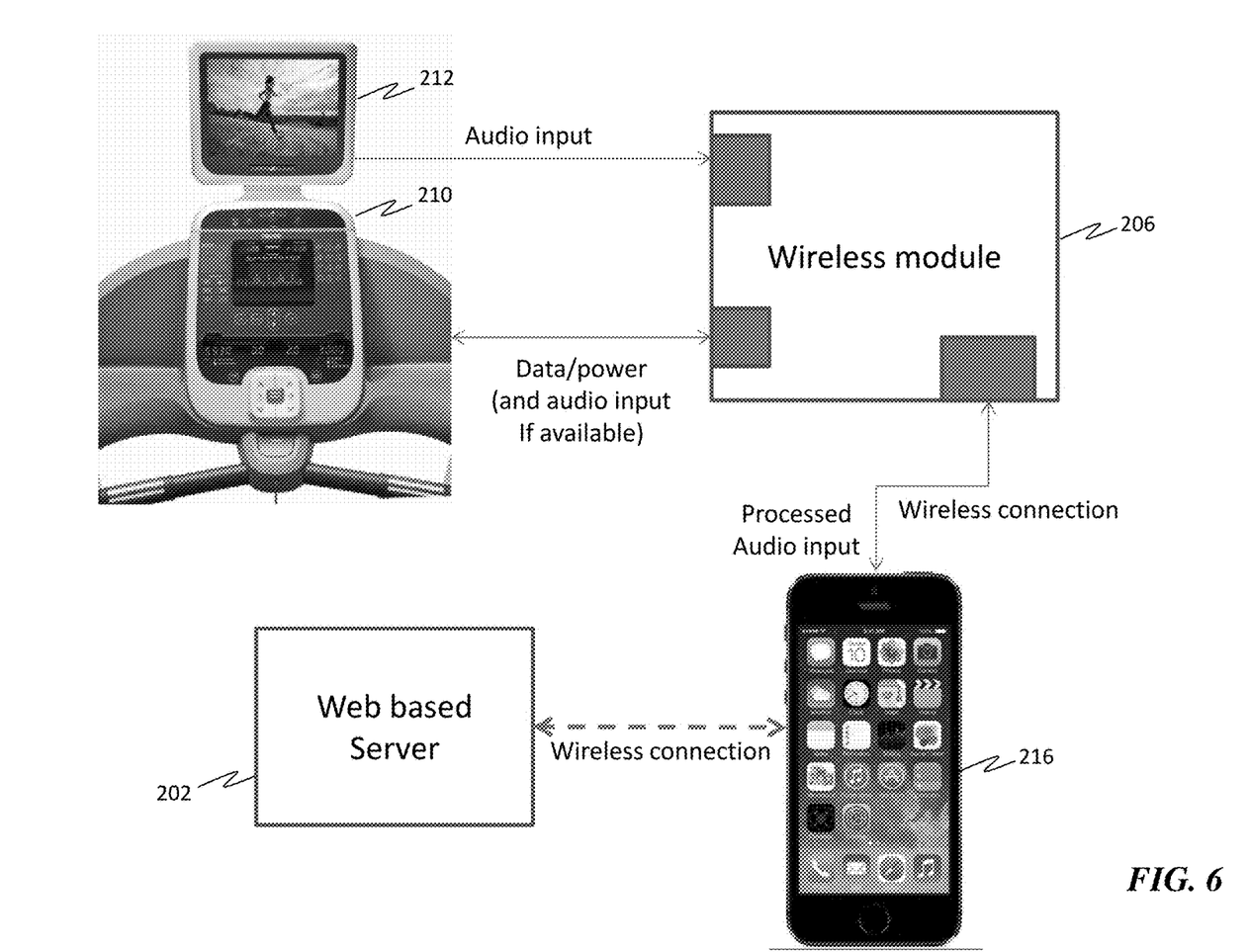
FIG. 6 shows a system for associating a signal source with an exercise machine and/or a Personal Mobile Device (PMD) of someone using the exercise machine, in accordance with still yet another embodiment of the invention.
Figure 7:
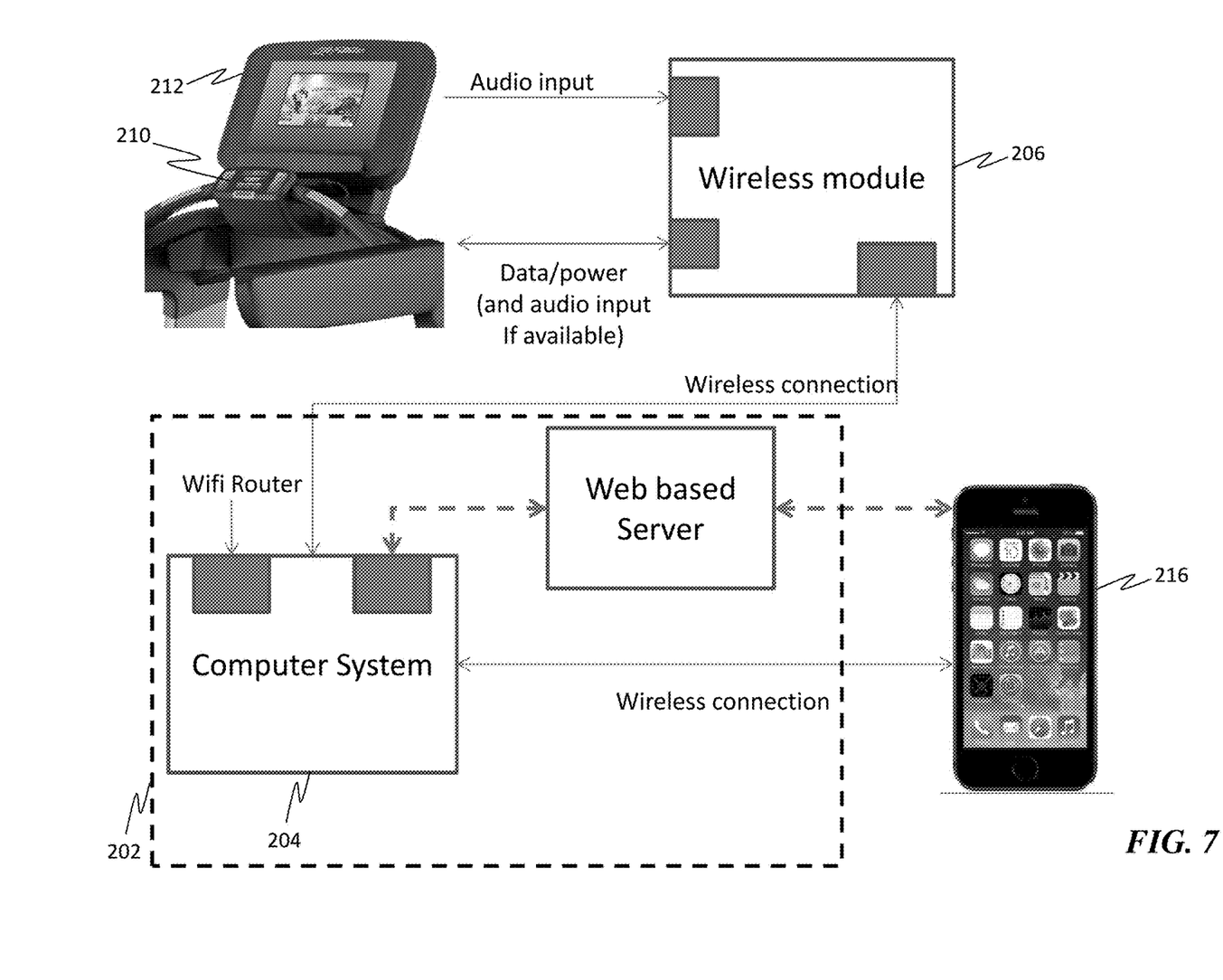
FIG. 7 shows a system for associating a signal source with an exercise machine and/or a Personal Mobile Device (PMD) of someone using the exercise machine, in accordance with still yet another embodiment of the invention.
Figure 8:
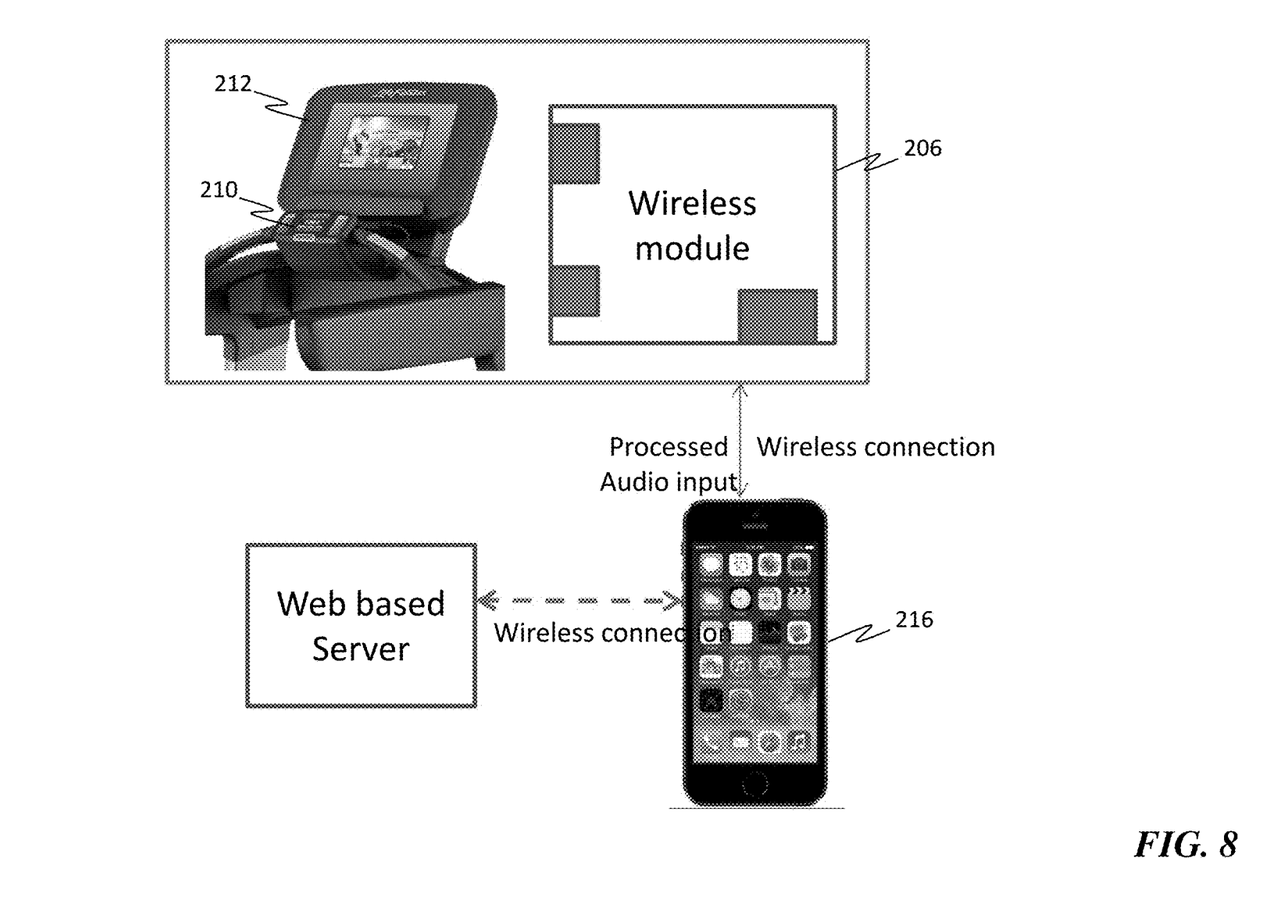
FIG. 8 shows a system for associating a signal source with an exercise machine and/or a Personal Mobile Device (PMD) of someone using the exercise machine, in accordance with still yet another embodiment of the invention.

In another embodiment, referring to FIG. 4 the method 100 may be implemented using only the exercise machine 210, the exercise machine television 212 and/or the user's PMD 216. In this embodiment, the audio/video signal may be communicated to the exercise machine 210 and/or the exercise machine television 212 (either directly and/or via a Set Top Box 208) and the exercise machine 210 and/or the exercise machine television 212 may include the hardware/software necessary to identify the user (facial recognition, NFC, barcode, etc. . . . as described above) and communicate (or make available) the audio channel for the video channel being displayed to the user via the software application resident on the user's PMD. Additionally, if the user changes exercise machines, the software application resident on the user's PMD 216 may retain the channel setting that the user was previously viewing (or a preferred channel setting). As such, when the user approaches or begins using a second exercise machine, the second exercise machine identifies the user and may communicate with the software application resident on the user's PMD 216 which may cause the second exercise machine television to be tuned to the last and/or preferred channel. The channel may then be made available or communicated to the software application resident on the user's PMD 216.

Referring to FIG. 5, FIG. 6, FIG. 7 and FIG. 8, other embodiments of the system 200 for associating a signal source 208 (such as an audio and/or video signal source) with a particular exercise machine 210, exercise machine television 212 and/or a Personal Mobile Device (PMD) 216 of someone using the exercise machine 210 are shown. It should be appreciated that the PMD 216 may be any personal mobile device suitable to the desired end purpose, such as for example, a PDA, a smartphone, an iPhone, an iPad, an iComputer, a tablet, an MP3 player, a computing device, etc.

In accordance with the present invention, the processing of the invention may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing.

Moreover, the method of the present invention may be embodied in the form of a computer or controller implemented processes. The method of the invention may also be embodied in the form of computer program code containing instructions embodied in tangible media, such as floppy diskettes, CD-ROMs, hard drives, Solid State Drives (SSD) and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

It should be appreciated that while the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Moreover, it is contemplated that elements of one embodiment may be combined with elements of other embodiments as desired. Therefore, it is intended that the invention not be limited to a particular embodiment disclosed herein as the best mode contemplated for carrying out this invention, but that the invention will include all embodiments (individually and/or combined) falling within the scope of the appended claims and/or information. Moreover, unless specifically stated any use of the terms first, second, etc. do not denote any order or importance, but rather the terms first, second, etc. are used to distinguish one element from another.

We claim:

1. A system for allowing a data signal to be associated with a specific personal mobile device, wherein the specific personal mobile device is associated with a user of an exercise machine, the system comprising:
   a signal source, wherein the signal source is communicated with at least one of the exercise machine and an exercise machine television;
   an identification device, wherein the identification device is configured to identify the user of the exercise machine; and
   a processing device,
      wherein the processing device is communicated with at least one of the exercise device and the identification device, and
      wherein the processing device is configured to receive at least a portion of the data signal and automatically associate the at least a portion of the data signal with the specific personal mobile device responsive to the identification device, such that the at least a portion of the data signal remains associated with the specific personal mobile device.

2. The system of claim 1, further comprising
   a communication module,
   wherein the communication module is communicated with the processing device and at least one of the exercise machine and the exercise machine television, and
   wherein the processing device is further configured to transmit the at least a portion of the data signal to the personal mobile device.

3. The system of claim 1, wherein the personal mobile device is associated with the user of the exercise machine.

4. The system of claim 1, wherein the identification device is configured to identify the user using at least one of Facial Recognition technology, Near Field Communication technology, barcode scanning technology, Biometric technology and Optical Sensor technology.

5. The system of claim 1, wherein at least one of the exercise machine and the exercise machine television is configured to communicate with the processing device and inform the processing device which channel is being displayed to the user.

6. The system of claim 5, wherein the processing device is configured to transmit the at least a portion of the data signal to the personal mobile device responsive to the channel being displayed to the user.

7. The system of claim 1, wherein the data signal is at least one of an audio/video signal, an audio signal, a video signal, a satellite radio signal and a web based content signal.

8. The system of claim 1, wherein the signal source is a Cable/Satellite Set Top Box.

9. The system of claim 1, wherein the personal mobile device is at least one of a PDA, a smartphone, a tablet, an MP3 player and a computing device.

10. A system for associating an audio signal with a specific personal mobile device, the system comprising:
an exercise machine;
an exercise machine television, wherein the exercise machine television is associated with the exercise machine;
a signal source, wherein the signal source is communicated with the exercise machine television;
an identification device, wherein the identification device is associated with the exercise machine and configured to automatically identify a user of the exercise machine wherein the specific personal mobile device is associated with the user of the exercise machine; and
a processing device,
wherein the processing device is communicated with at least one of the exercise device and the identification device, and
wherein the processing device is configured to automatically identify a channel being displayed on the exercise television and communicate the audio signal for the channel to the personal mobile device responsive to the identification device, such that the at least a portion of the data signal remains associated with the specific personal mobile device.

11. The system of claim 10, further comprising a communication module,
wherein the communication module is communicated with the processing device and at least one of the exercise machine and the exercise machine television, and
wherein the processing device is further configured to transmit the audio signal to the personal mobile device.

12. The system of claim 10, wherein the personal mobile device is associated with the user of the exercise machine.

13. The system of claim 10, wherein the identification device is configured to identify the user using at least one of Facial Recognition technology, Near Field Communication technology, barcode scanning technology, Biometric technology and Optical Sensor technology.

14. The system of claim 10, wherein at least one of the exercise machine and the exercise machine television is configured to communicate with the processing device and inform the processing device which channel is being displayed to the user.

15. The system of claim 14, wherein the processing device is configured to transmit the audio signal to the personal mobile device responsive to the channel being displayed to the user.

16. The system of claim 10, wherein the audio signal includes at least one of an audio/video signal, an audio signal, a satellite radio signal and a web based content signal.

17. The system of claim 10, wherein the signal source is a Cable/Satellite Set Top Box.

18. The system of claim 10, wherein the personal mobile device is at least one of a PDA, a smartphone, a tablet, an MP3 player and a computing device.

19. A method for associating an audio signal with a specific Personal Mobile Device (PMD), wherein the specific PMD is associated with a user, the method comprising:
associating at least one of the user and the specific PMD with a processing device;
determining if the user is using an exercise machine having an exercise machine television and automatically identifying which exercise machine the user is using;
determining which channel is being displayed on the exercise machine television; and
transmitting the audio signal for the channel being displayed on the exercise machine television to the specific PMD, such that the audio signal remains associated with the specific PMD.

20. The method of claim 19, wherein the audio signal is transmitted to the user's PMD via at least one of the processing device, the exercise device and the exercise device television.

* * * * *